United States Patent
Shartzer

(10) Patent No.: US 10,560,498 B2
(45) Date of Patent: Feb. 11, 2020

(54) CONTEXTUAL BASED COMMUNICATION METHOD AND USER INTERFACE

(75) Inventor: Lee Douglas Shartzer, Valencia, CA (US)

(73) Assignee: InterDigital CE Patent Holdings, Paris (FR)

( * ) Notice: Subject to any disclaimer, the term of this patent is extended or adjusted under 35 U.S.C. 154(b) by 269 days.

(21) Appl. No.: 14/236,285

(22) PCT Filed: Jul. 31, 2012

(86) PCT No.: PCT/US2012/048942
§ 371 (c)(1),
(2), (4) Date: Jan. 30, 2014

(87) PCT Pub. No.: WO2013/019777
PCT Pub. Date: Feb. 7, 2013

(65) Prior Publication Data
US 2014/0181690 A1  Jun. 26, 2014

Related U.S. Application Data

(60) Provisional application No. 61/513,990, filed on Aug. 1, 2011.

(51) Int. Cl.
*H04L 29/06* (2006.01)
*G06F 3/0484* (2013.01)
(Continued)

(52) U.S. Cl.
CPC ........ *H04L 65/403* (2013.01); *G06F 3/04842* (2013.01); *G06Q 10/10* (2013.01); *G06Q 50/01* (2013.01); *H04L 67/306* (2013.01)

(58) Field of Classification Search
CPC ..... H04L 67/306; H04L 12/58; H04L 65/403; H04L 12/1822; H04L 29/08306;
(Continued)

(56) References Cited

U.S. PATENT DOCUMENTS

| 7,606,860 B2 | 10/2009 | Puthenkulam et al. |
| 2004/0122681 A1 | 6/2004 | Ruvulo et al. |

(Continued)

FOREIGN PATENT DOCUMENTS

| CN | 101939745 | 1/2011 |
| CN | 102055826 | 5/2011 |

(Continued)

OTHER PUBLICATIONS

International Search Report for PCT/US12/048942 dated Oct. 19, 2012 (8 pages).

*Primary Examiner* — Sang H Kim
(74) *Attorney, Agent, or Firm* — Jack Schwartz & Associates, PLLC

(57) ABSTRACT

The present disclosure is directed towards automatically determining a context of an communication which is to be sent to a first user (615). Once the communication context is determined, other users are automatically suggested to receive the communication in that a characteristic of the user profiles of the suggested users match the context of the communication (630). The communication can then be forwarded to the suggested users in accordance with user input (635).

12 Claims, 8 Drawing Sheets

(51) Int. Cl.
  *G06Q 50/00*  (2012.01)
  *H04L 29/08*  (2006.01)
  *G06Q 10/10*  (2012.01)

(58) Field of Classification Search
  CPC ............ H04L 51/046; G06F 17/30867; G06F 3/0481; G06F 15/16; G06F 17/27
  USPC .................... 705/319; 709/204; 715/753, 751
  See application file for complete search history.

(56) References Cited

U.S. PATENT DOCUMENTS

| | | | |
|---|---|---|---|
| 2005/0192822 A1 | 9/2005 | Hartenstein et al. | |
| 2008/0147501 A1* | 6/2008 | Gilliam | G06Q 10/107 705/14.66 |
| 2009/0013386 A1* | 1/2009 | Puthenkulam | H04L 67/104 726/4 |
| 2009/0204601 A1 | 8/2009 | Grasset | |
| 2010/0185630 A1* | 7/2010 | Cheng | G06F 17/30867 707/756 |
| 2010/0223335 A1* | 9/2010 | Fu | H04L 12/1818 709/205 |
| 2010/0279667 A1* | 11/2010 | Wehrs | G06Q 30/02 455/414.1 |
| 2011/0183651 A1 | 7/2011 | Mundy et al. | |
| 2011/0202406 A1* | 8/2011 | Suomela | G06Q 30/02 705/14.52 |
| 2012/0020465 A1* | 1/2012 | Davies | G10L 15/22 379/88.01 |
| 2012/0158853 A1* | 6/2012 | Baartman | H04L 51/04 709/206 |
| 2013/0185359 A1* | 7/2013 | Liu | H04L 67/24 709/204 |
| 2014/0108526 A1* | 4/2014 | Garcia-Barrio | G06Q 50/01 709/204 |
| 2016/0314112 A1* | 10/2016 | Harari | G06F 17/2765 |

FOREIGN PATENT DOCUMENTS

| | | |
|---|---|---|
| WO | 2009091655 | 7/2009 |
| WO | 2010034336 | 4/2010 |
| WO | 2010107566 | 9/2010 |

\* cited by examiner

300

SOCIAL NETWORK SERVICE RECOGNIZES THAT YOUR MESSAGE IS ABOUT "DOGS", WOULD YOU LIKE TO SEND THIS MESSAGE TO OTHER CONNECTED USERS WHO ALSO LIKE "DOGS"

SOCIAL NETWORK SERVICE RECOGNIZES THAT YOUR MESSAGE IS ABOUT "DOGS", WOULD YOU LIKE TO SEND THIS COMMUNICATION TO OTHER CONNECTED USERS WHO SHARE YOUR INTEREST. PLEASE INDICATE WHO BELOW:
CONNECTED USER 2 [ ]
CONNECTED USER 3 [ ]
CONNECTED USER 4 [ ]

NETWORK SERVICE RECOGNIZES THAT YOUR MESSAGE TO USER 2 IS ABOUT "DOGS", WOULD YOU LIKE TO SEND THE SAME MESSAGE TO THE FOLLOWING USERS:
CONNECTED USER 3 [ ]
CONNECTED USER 4 [ ]

CONTEXTUAL BASED COMMUNICATION METHOD AND USER INTERFACE

CROSS REFERENCE TO RELATED APPLICATIONS

This application claims the benefit, under 35 U.S.C. § 365 of International Application PCT/US2012/48942, filed Jul. 31, 2012, which was published in accordance with PCT Article 21(2) on Feb. 7, 2013 in English and which claims the benefit of U.S. provisional application No. 61/513,990, filed Aug. 1, 2011.

FIELD OF THE INVENTION

The present disclosure generally to communication networks, and more specifically to a user interface that is used for selecting a subgroup of users to receive a communication.

BACKGROUND OF THE INVENTION

When a status update, as a type of electronic communication, is posted by a user on a social networking service, a message is usually forwarded to everyone who has been identified as the user's friend. Alternatively, the user may have the ability to send an electronic communication to a specific person to whom the communication is specifically addressed. A drawback of both communication or messaging approaches is that there is no middle ground where a posting is made to only a select group of people without selecting such individuals ahead of time.

SUMMARY OF THE INVENTION

A method and corresponding user interface are directed towards determining a context of an electronic communication which is to be sent to a first user. Once the electronic communication context is determined, other users are automatically suggested to receive the communication in that a characteristic of the user profiles of the suggested users match the context of the electronic communication. The electronic communication can then be forwarded to the suggested users in accordance with a user input.

DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views:

FIG. 3 displays a user interface in accordance with an embodiment of the present disclosure;

FIG. 4 displays a user interface in accordance with an embodiment of the present is disclosure;

FIG. 5 displays a user interface in accordance with an embodiment of the present disclosure;

DESCRIPTION OF THE PREFERRED EMBODIMENTS

For purposes of this specification, the term "electronic communication" can be a communication from a first user to a second user which can be transmitted as an electronic mail, text message, short message service, multimedia message service, posting on a social network service such as FACEBOOK, tweet on a service such as TWITTTER, photo, blog posting, instant message, video, audio, message posting, voice message, and the like.

Users can be known as being linked or connected when a first user and a second user are "FRIENDS" of each other through a social networking service, where the first and second users are listed on the same list of a third user, a first and second user are grouped together in the same category either implicitly or explicitly with each other's permission, a first and second user are grouped together in the same category either implicitly or explicitly by a third party; and the like.

Figure 1:
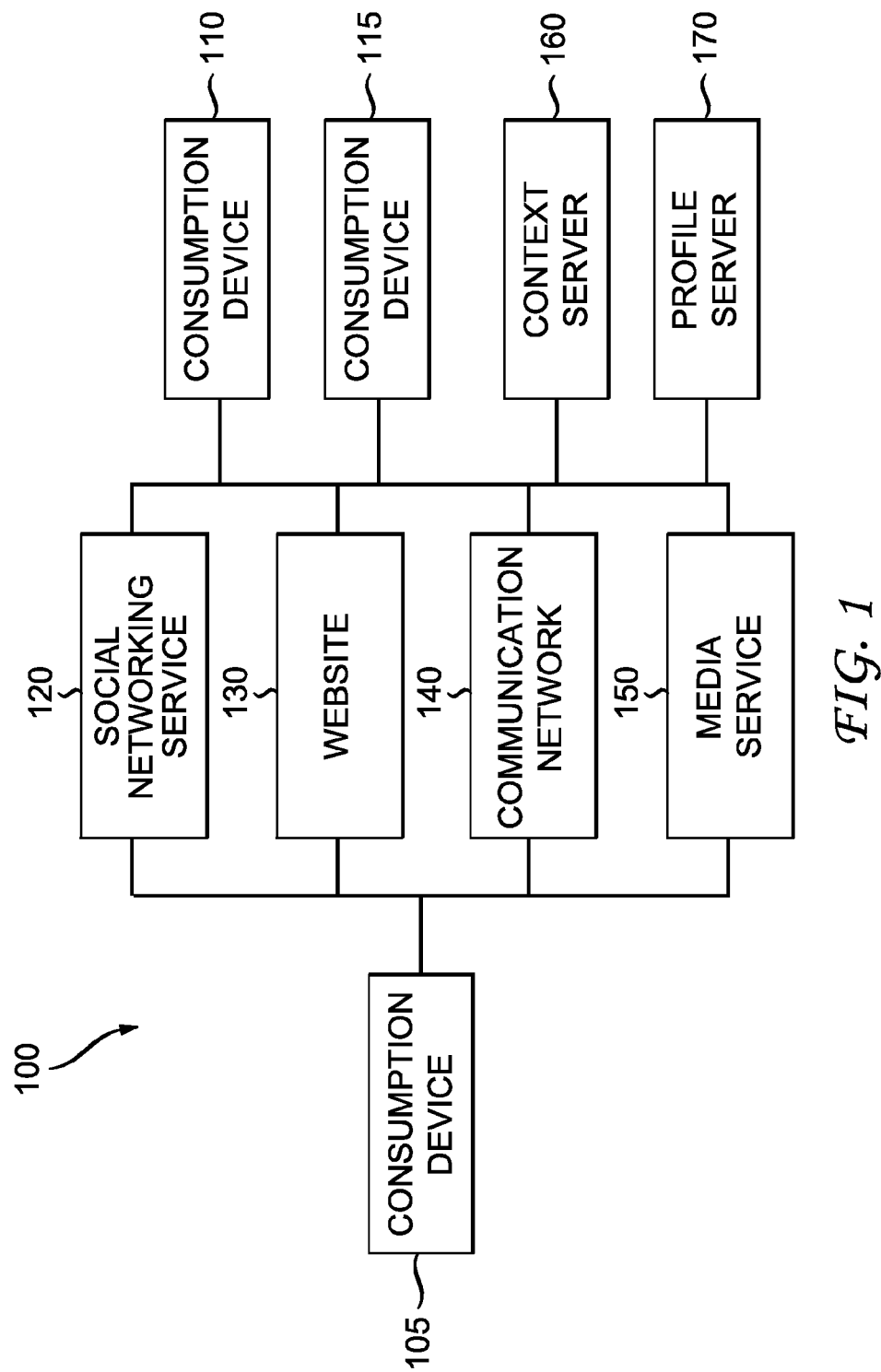
FIG. 1 is a block diagram of an exemplary system transmitting communications between users in accordance with an embodiment of the present disclosure.

FIG. 1 is an exemplary embodiment of a system 100 in accordance with the present disclosure. Consumption device 105 represents a device such as a computer, set top box, tablet, television, phone, personal access device, gateway, and the like that is used to communicate an electronic communication to other devices such as consumption device 110 or consumption device 115.

The electronic communications between users operating consumption devices 105, 110, and 115 can take place through various communication services such as social network service 120. Examples of social networking services include, but are not limited to, FACEBOOK, MYSPACE, LINKEDIN, and the like. Electronic communications between users can also take place via a website 130 and/or a communication network 140 such as, and not limited to, a telephone connection, satellite, connection, cellular network, WI-FI Digital Subscriber Line (DSL), Internet communication, and the like. A media service 150, but not limited to, such as NETFLIX, M-GO, AMAZON CLOUD SERVICE, ITUNES, PANDORA, and the like can also be used to communicate electronic communications between users who use devices such as consumption devices 105, 110, and 115.

Context server 160 can be implemented as a device that determines a context from an electronic communication that is transmitted from a first user to a second user when using devices such as consumption devices 105, 110, 115, where electronic messages can be forwarded, intercepted, and the like by context server 160. A context of an electronic message can be determining a topic of a particular message although other characteristics of an electronic message can be determined. For example, an electronic message where a user writes something such as "I like Beagles" would be about dogs while a message stating "IRON MAN 2 is great" can indicate that the electronic communication is about a movie.

The determination of a context of an electronic message can be done taking an electronic message and breaking down the sentences in such a message into a series of keywords which are mapped to topics. That is, each sentence is processed to eliminate stop words where the remaining words are denoted as being keywords. The stop words are commonly used words that do not add to the semantic meaning of a sentence (e.g. of, on, is, an, the, etc.). Stop word lists for English language are well known. A preprocessing step, which can be part of having context server 160 read the stop words from such a list and removes them from the text stream.

The keywords are can be mapped to a series of topics (as query terms) by using a predetermined thesaurus database that associates certain keywords with a particular topic. This database can be set up where a limited selection of topics are defined (such as particular people, subjects, and the like) and various keywords are associated with such topics by using a comparator that attempts to map a keyword against a particular subject. For example, thesaurus database (such as WordNet and the Yahoo OpenDirectory project) can be set up where the keywords such as money, stock, market, are associated with the topic "finance". Likewise, keywords such as President of the United States, 44th President, President Obama, Barack Obama, are associated with the topic "Barack Obama". Other topics can be determined from keywords using similar approaches for topic determination. Another method for determining could use Wikipedia (or similar) knowledge base where content is categorized based on topics. Given a keyword that has an associated topic in Wikipedia, a mapping of keyword to topics can be obtained for the purposes of creating a thesaurus database, as described above.

Once such topics are determined for each sentence, such sentences can be represented in the form of: <topic_1: weight_1; topic_2;weight_2, . . . , topic_n,weightN,ne_1, ne_2, . . . ,ne_m>.

Topic_i is the topic that is identified based on the keywords in a sentence, weight_i is a corresponding relevance, Ne_i is the named entity that is recognized in the sentence. Named entities refer to people, places and other proper nouns in the sentence which can be recognized using grammar analysis. These weights can then be used for determining a user profile where topics with a higher weight are more likely positively correlated to a user's preferences that a topic with a lower weight.

It is possible that some entity is mentioned frequently but is indirectly referenced through the use of pronouns such as "he, she, they". If each sentence is analyzed separately such pronouns will not be counted because such words are in the stop word list. The word "you" is a special case since it is used frequently. The use of name resolution will help assign the term "you" to a specific keyword/topic referenced in a previous/current sentence. Otherwise, "you" will be ignored if it can't be referenced to a specific term. To resolve this issue the name resolution can be done before the stop word removal. Other implementations are possible in accordance with the disclosed exemplary embodiments.

In an optional embodiment, the contexts that are derived by context server 160 can be automatically rendered as graphical elements that are represented in association with a user profile. That is, if the developed contexts represent different topics, such topics can be shown as icons, pictures, and the like when a user's profile is displayed using information from profile server 170 where such graphical elements can be associated with a user profile automatically. Such elements can be selected by a user as well, for example, where the user has previously specified a particular interest such as "baseball", a graphical element for a baseball can be shown with the user's profile.

From the development of the context of an electronic communication from server 160, a profile can be determined for respective users by profile server 170. That is, the context of the electronic communications sent from a first user to a second user can indicate topics of interest that appeal to the first user. Such contexts can be the topics of the electronic messages transmitted from the first user to the second user. A profile for a user can be generated using implicit techniques based on approaches similar to those described for context server 160, the type of media consumed by a user, and the like. Profiles can also be generated by explicit techniques where a user specifies their interests via a survey or other means of specifying preferences. A combination of implicit and explicit techniques can be used by profile server 170 to develop profiles for each user in accordance with the principles of the exemplary disclosed embodiments. Profile 170 can contain graphical elements representing different contexts such as topics which can be associated with a user's profile when displayed.

In an optional embodiment, context server 160 can be implemented within consumption device 105, 110, 115, within social networking service 120, website 130, communication network 140, media service 150, and the like. In an another optional embodiment, profile server 170 can be implemented within consumption device 105, 110, 115, within social networking service 120, website 130, communication network 140, media service 150, and the like.

Figure 2:
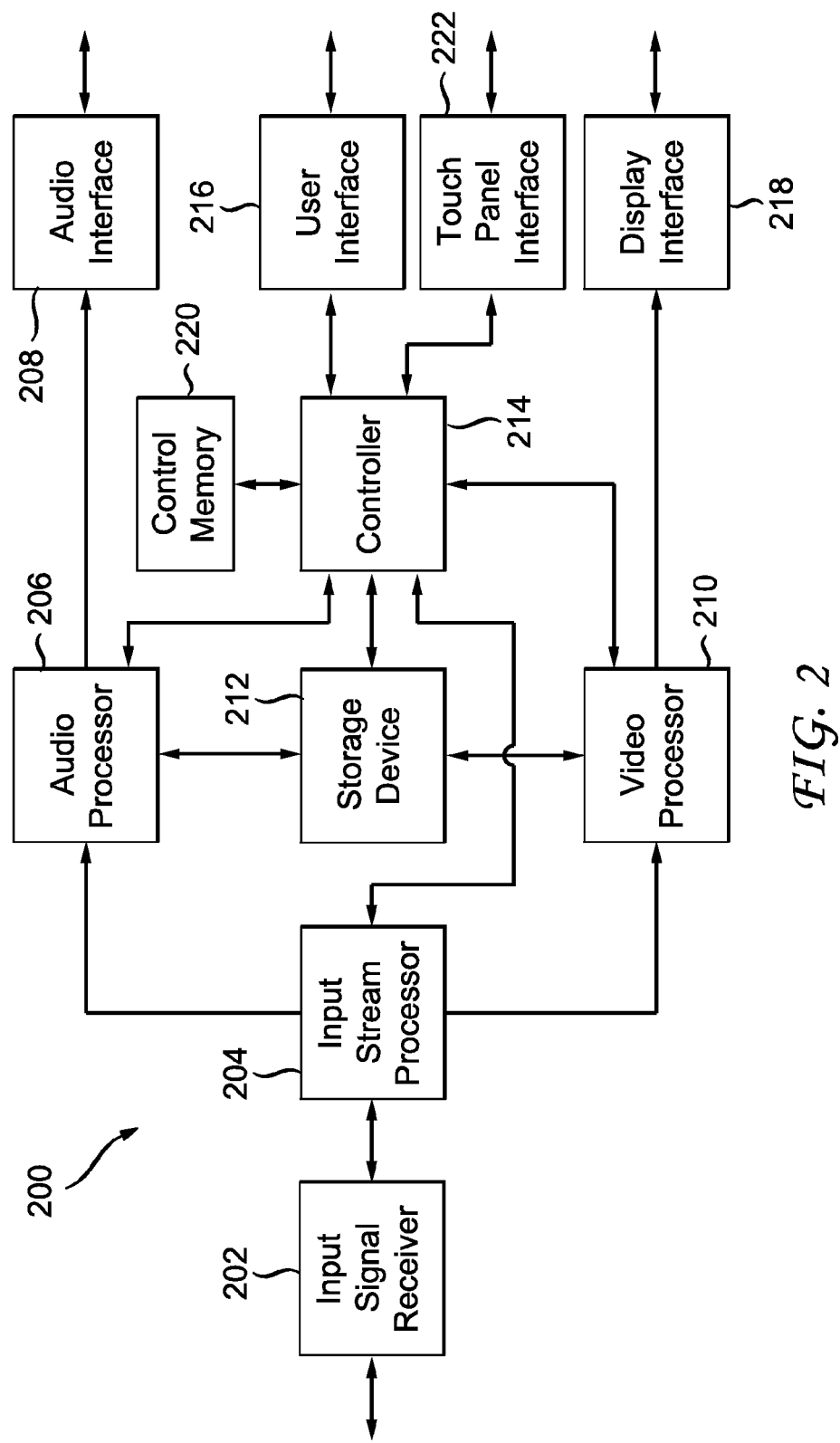
FIG. 2 is a block diagram of an exemplary consumption device in accordance with an embodiment of the present disclosure.

Turning now to FIG. 2, a block diagram of an embodiment of a consumption device 200 is shown. The device 200 shown can be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 can be one of several known receiver circuits used for receiving, demodulation, and decoding signals provided over one of the several possible networks including over the air, cable, satellite, Ethernet, fiber and phone line networks. The desired input signal can be selected and retrieved by the input signal receiver 202 based on user input provided through a control interface or touch panel interface 222. Touch panel interface 222 can include an interface for a touch screen device. Touch panel interface 222 can also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interlace 208 and further to the display device or audio amplifier. Alternatively, the audio interface 208 can provide a digital signal to an audio output device or display device using a High-Definition Multimedia Interface (HDMI) cable or alternate audio interface such as via a Sony/Philips Digital Interconnect Format (SPDIF). The audio interface can also include amplifiers for driving one more sets of speakers. The audio processor 206 also performs any necessary conversion for the storage of the audio signals.

The video output from the input stream processor 204 is provided to a video processor 210. The video signal can be one of several formats. The video processor 210 provides, as necessary, a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 can be a hard disk drive, one or more large capacity integrated electronic memories, such as static RAM (SRAM), or dynamic RAM (DRAM), or can be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 can be an analog signal interface such as red-green-blue (RGB) or can be a digital interface such as HDMI. It is to be appreciated that the display interface 218 will generate the various screens for presenting the search results in a two dimensional form as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 can interface with a search engine for the searching of content and the creation and adjusting of the display of graphical objects representing such content which can be stored or to be delivered via content server 110, described above.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 can store instructions for controller 214. Control memory 220 can also store a database of elements, such as graphic elements containing content, various graphic elements used for generating a displayed user interface for display interface 218, and the like. Alternatively, the memory can store the graphic elements in identified or grouped memory locations and use an access or location table to identify the memory locations for the various portions of information related to the graphic elements. In addition, various graphic elements can be generated in response to computer instructions interpreted by controller 214 for output to display interface 218. Additional details related to the storage of the graphic elements will be described below. Further, the implementation of the control memory 220 can include several possible embodiments, such as a single memory device or, alternatively, more than one memory circuit communicatively connected or coupled together to form a shared or common memory. Still further, the memory can be included with other circuitry, such as portions of bus communications circuitry, in a larger circuit.

Optionally, controller 214 can be adapted to extract metadata from audio and video media by using audio processor 206 and video processor 210, respectively. That is, metadata that is contained in the video signal in the vertical blanking interval, auxiliary data fields associated with video, or in other areas in the video signal can be harvested by using the video processor 210 with controller 214 as to generate metadata that can be used for functions such as generating an electronic program guide, providing descriptive information about received video, supporting an auxiliary information service, and the like. Similarly, the audio processor 206 working with controller 214 can be adapted to recognize audio watermarks that can be in an audio signal. Such audio watermarks can then be used to perform some action such as the recognition of the audio signal identifying the source of an audio signal, or performing some other service. Furthermore, metadata to support the actions listed above can come from a network Referring back to FIG. 1, an exemplary embodiment begins with a user denoted as user X who operates a consumption device 105. The user X has friends and acquaintance that user X can link to through a social network service 120 where each friend can use a consumption device 110, 115. In one setting using social network service 120, user X links to other users by sending a "friend" request to other users, whereby the other users will be connected to user X if the "friend" request is accepted. In this current example, user X can be connected to a plurality of other people through the social networking service 120, for example User X connects to a Connected User 1, Connected User 2, Connected User N. Other ways of connecting users together can be utilized in accordance with the principles of the exemplary embodiments Once connected to other users, user X can post pictures, videos, messages, and the like to their account where such messages are transmitted to all of the other friends/acquaintances to which the user X in linked to through social networking service 120. Alternatively, user X can send any of these items uniquely to a single user.

An exemplary embodiment of the present disclosure teaches that when a user X transmits an electronic communication to a first user where the electronic communication is of a particular context, a suggestion is made to user X to send a specific message or content to other connected users, based on the profile information of such connected users. That is, profile server 170 develops a unique profile for users based on a number of criteria such as, but not limited to, a user's age, location, marital status, preferences of the user, what content the user typically posts, identifying by keyword analysis the subject matter of the user, and other information can be used for developing such profiles. In addition, a user profile can be further developed by profile server 170 based upon the profiles of connected users linked to user X.

For example, connected users 1 and 2 each have information in their profile that indicates that they enjoy a specific sports team while connected users 3 and 4 like to receive communications about dogs. The social networking system 120 that operates with context server 160 and profile server 170, in this example, can determine through keyword analysis based on the posts that User X receives that User X likes sports (because user X is connected to connected users 1 and 2) and User X likes dogs as well (based on postings from connected users 3 and 4). This can be accomplished by determining the context of different electronic communications in accordance with the disclosed exemplary embodiments.

Continuing with this example, a larger listing of subjects for different user profiles are shown in TABLE 1:

TABLE 1

|  | Sports | Movies | Dogs | Cats | Food |
|---|---|---|---|---|---|
| User X | X | X | X | X |  |
| Connected User 1 | X | X |  | X |  |
| Connected User 2 | X | X | X |  |  |
| Connected User 3 |  | X | X |  | X |
| Connected User 4 | X | X | X | X |  |

In this present embodiment, user X and connected users 1-4 have a variety of subjects in which they have been identified in having an interest. Such profile information as determined by profile server 170 can be additionally established through demographic information entered in by the users, monitoring what the users do, the topics of the postings that the users send which can be determined via keyword analysis, social network analysis, and the like.

In an exemplary embodiment, user X sends an electronic communication that is determined to be about Dogs by context server 160. Instead of having the posting go to all of the users operating various consumption devices, the electronic message can be transmitted only to users who profile information indicates that they user likes dogs (e.g., connected users 2-4) as indicated in TABLE 1. This can be determined by profile server 170 working in concert with a service such as social network service 120, website 130, communication network 140, media service 150, and the like.

In an alternative embodiment, right after user X transmits an electronic communication, a message 300, as shown in FIG. 3, can be presented to user X. If user X indicates that they do want to take advantage of this option, the system will automatically send the electronic communication about dogs to connected users 2, 3, and 4.

An exemplary embodiment can also present a user X with a message 400 as shown in FIG. 4, after the user transmits an electronic communication. In this embodiment, user X will use an interface, such as a touch screen, mouse, keyboard, input device, and the like to select which users should receive such a message. If, for example, user X selects connected users 2 and 3, the message will go to them, but not to connected user 4. Additionally, because the profile of connected user 1 is not associated with dogs, their name will not be listed as a connected user to be notified.

An additional embodiment of indicating the options a user X has when transmitting an electronic communication is shown as message 500 in FIG. 5. When a user X transmits an electronic communication to a single connected user (such as 2), a message 500 can be automatically generated where user X selects which users should receive the message based on the context of the message. In this example, connected user 1 is not listed in the message because the profile information for that user is not associated with dogs; hence a prompt for user 1 is not shown in message 500.

In an optional embodiment, a user X can designate specific topics of interest to different connected users. For example, user X can designate that connected user 3 likes sports, even though the profile information does not indicate that this is the case. That is, user X can designate that a specific user should automatically receive electronic communications about a particular topic, where such a determination is made by context server 160 on the fly when analyzing electronic communications transmitted by user X.

Figure 6:
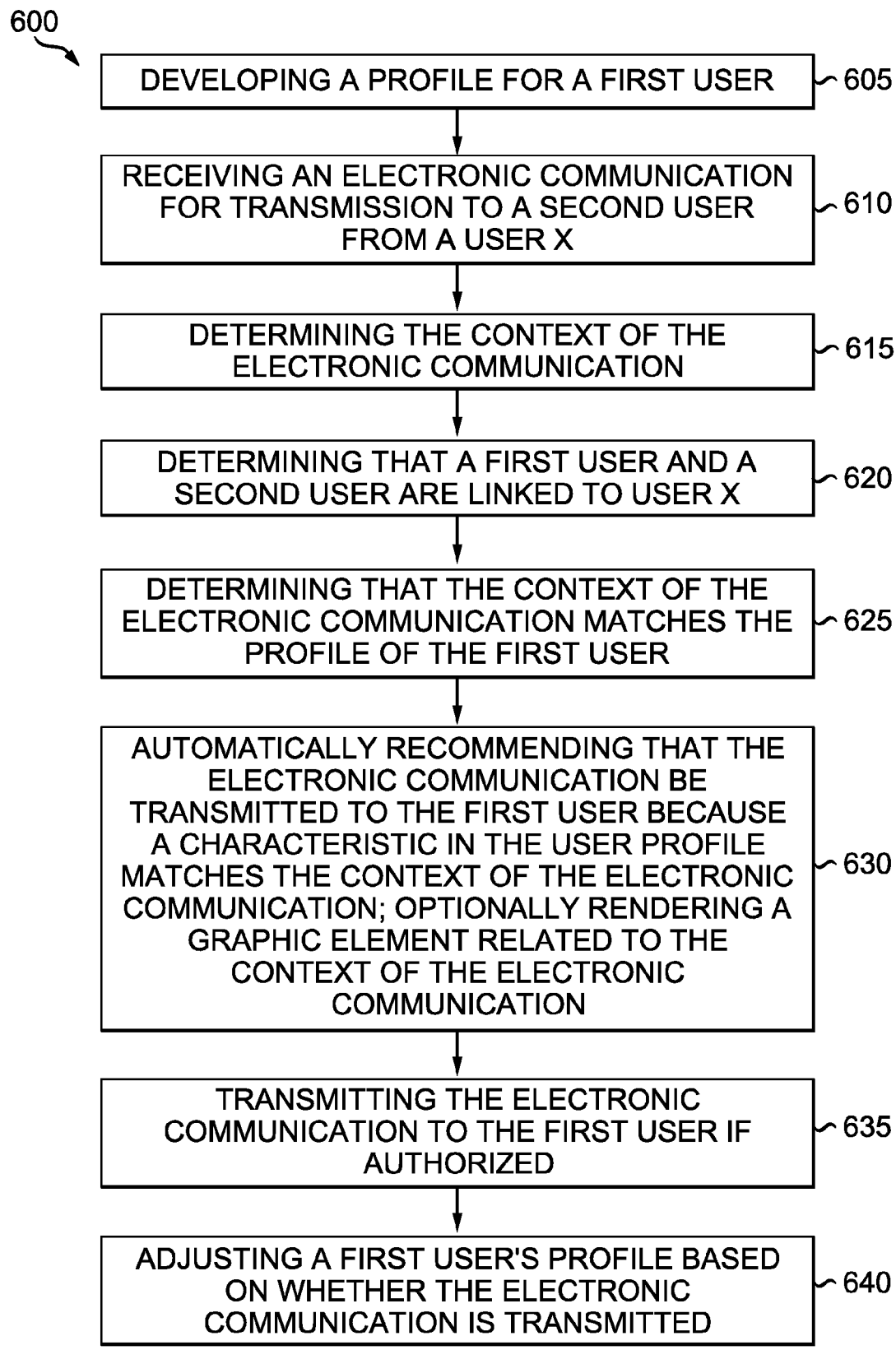
FIG. 6 illustrates an exemplary embodiment of a flow diagram for determining a context of a user transmitted electronic communication in accordance with an embodiment of the present disclosure.

FIG. 6 shows a flow diagram 600 of an exemplary embodiment for a method implementing some of the principles described above. In step 605, a profile is developed for a first user, where the profile can be created by monitoring the interests of the user as disclosed in the presented embodiments. That is, the profile can be generated completely without user invention with the profile server 170 can monitor the prior behavior of a user and assign different subjects as types of contexts to the user, although other manners of generating profiles can be performed as well.

In step 610, a context server 160 and/or software running a service such as social network service 120, website 130, communication network 140, media service 150, and the like receives an electronic communication from a user X which is to be sent to a second user. Within the context of a social network or other messaging schema, user X will typically link to other users where the users are known as "friends" or some other term. When user X then transmits an electronic message to, all of the users to whom the user X is linked to receives the message. User X can also transmit private messages to users that they are linked to by selecting a specific user to receive an electronic communication. In the present embodiment, a private message is meant to be sent to a second user (where the message is not currently addressed to first user).

In the analysis performed in step 615 by context server 160, a particular subject or other relevant information is determined from the message being sent from user X to a second user. That is, the text of the message is analyzed to determine context such as a subject, or associated metadata of a picture, video file, audio file, and the like can also be analyzed to determine a subject or information that can be used for a profile.

In step 620, a determination is made as to which users are linked to user X. In the present case, a determination is made that user X is linked to the first user. Other users can also be linked to user X, in accordance with the disclosed principles.

In step 625, the context determined in step 615 is matched against profile of a first user. If there is a profile match where the electronic communication would be of particular interest to first user based on characteristics in their profile, user X is asked (via a text message or other notification) whether or not the user would want the first user to receive a copy of the same communication being sent to the second user. This determination (in step 630) is made based on that first user is linked to user X and the profile of first user indicates that first user would be interested in the content of the communication sent from user X to the second user. As an optional embodiment, when a user profile can be displayed by generating a picture of the user and then a listing of the interests of the user are shown graphically. For example, a user picture would have displayed below pictures of a dog and a baseball if it was determined in step 605 that the user likes dogs and baseball. Such pictures which represent user interests are displayed automatically and are assigned to a user's profile automatically. This feature is explained in more detail later in this specification. Note, characteristics can be interests, topics, subjects, demographic and the like that can be used as part of a user's profile.

If user X wants to have the communication forwarded to the first user, in step 635, the message can be transmitted to the first and second user.

In step 640, the profile for the first user can be adjusted based on how the user follows up with the message received from user X. For example, if there is a link to a web site or other asset whereby the first user selects the link, the profile the first user can be adjusted noting that the first user is interested in the content associated with such a website or asset. Alternatively, if the first user responds back to user X, the new communication from the first user can be analyzed for keywords whereby the first user can be asked if they want the subject of their message to be related to other users that are linked to the user X and have a profile that matches the context of the message from the first user.

An optional feature to this "return path" aspect of the present embodiment, will only have message messages to which user X (the originator of the first message), first user (the sender of the second message), and second user (the receiver of the first message) are linked with. This is to prevent parties in which are not linked together from receiving messages in which they may not know the parties involved. For example, even though a third user is linked to the first user user X, such a user would not be recommended as the user is not linked to the second user.

Figure 7:
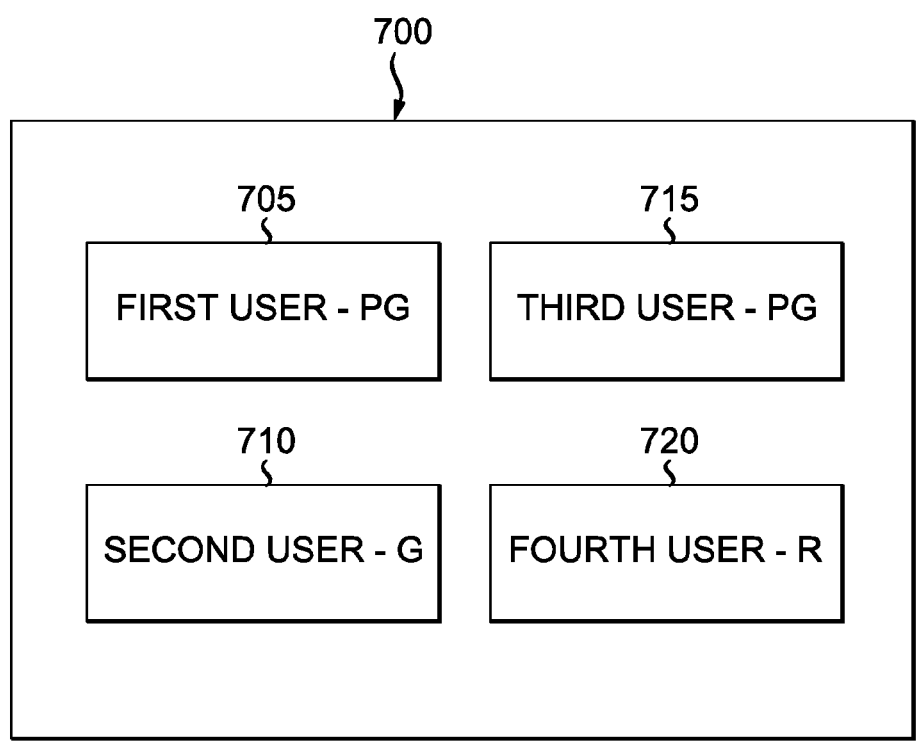
FIG. 7 displays a user interface in accordance with an embodiment of the present disclosure.

FIG. 7 presents an embodiment of a user interface 700 where various users are assigned different parental ratings in accordance with a ratings system such as Motion Picture Association of America (MPAA). That is, a context server 160 can be used to determine relative to the electronic communications sent by users what the parental rating that would associated with such a user. The user ratings of content that they prefer can be determined by profile server 170. Alternatively, a user (e.g., a father or mother) can set user ratings for other users (e.g., a teenage son, middle school age daughter, grammar school age son, and the like). For example, if a first user sends messages about guns and drugs, context server 160 can assign the first user a "PG" rating as shown in block 705. If a second user always sends communications that are free of profanity or restricted subjects, the second user can be assigned a rating of "G" as shown in block 710. Likewise, a third user is assigned a rating of "PG" as shown in is block 715 and a fourth user is assigned an "R" rating as shown in block 720.

Hence, when a user X transmits an electronic communication, the user interface 700 can be rendered which shows the respective rating of content that potential users are concerned with. Therefore, user X may decide not to transmit a message about guns to the second user because of the "G" rating, even though the fourth user wouldn't have a problem with such content because the fourth user has an "R" rating associated with their prior conduct. An alternative embodiment of the invention provides colors instead of ratings to indicate content restrictions. Hence, red would be for users that like adult content (rated PG, for example) while green would be for content that could be shown to almost anybody (rated G, for example).

Figure 8:
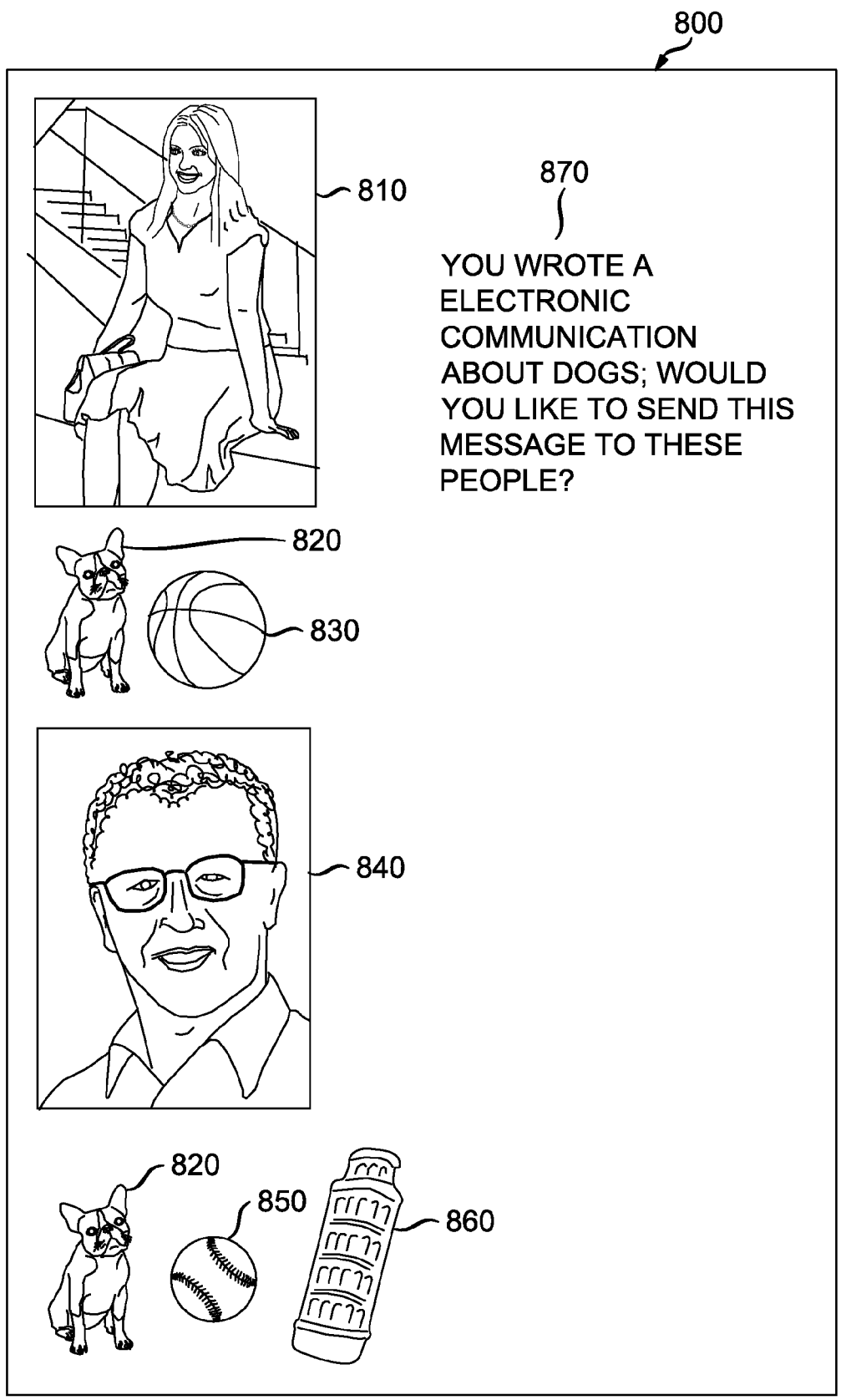
FIG. 8 displays a user interface for selecting users to message in accordance with an embodiment of the present disclosure.

FIG. 8 is exemplary embodiment of a user interface 800 that can be used to transmit electronic communications to different users. The user interface presents a message 870 indicating that the system determined that a user is drafting an electronic message about dogs. Specifically user interface 800 then presents users graphically such as user 810 and user 840 to whom such a communication can be communicated. When graphically generating the users, the interests of each respective user can also be generated using graphical elements such as an icon 820 representing a dog where a user has interest in "DOGS", a picture 830 showing a basketball showing an interest in "BASKETBALL", a picture 850 showing a baseball representing an interest in "BASEBALL", and a drawing 860 showing a tower corresponding to a context interest in "TRAVEL".

It is noted that there can be an option set that prioritized how the graphical elements such as 820, 830, 850, and 860 are represented. It is expect that a user will have many different interests; hence an option can be set that specifies a number of graphical elements that can be shown. In another option, the graphic elements such as 820 and 830 indicate a correlation to the importance of that topic or interest to a user. With this present option, the graphical element shown first 820 would be the most important to the user, while the second graphic element 830 would be the second most important topic, with additional graphical elements being presented in a ranked serial order. A third option, shows graphical elements when relevant for an electronic communication, where for example an electronic communication about "DOGS" would have a picture 820 shown for all users who have an interest in "DOGS". Likewise, a picture 850 and corresponding user pictures such as 840 would be shown for all users who have an interest in "BASEBALL". Combinations of these options can be implemented in accordance with the disclosed exemplary embodiments.

From the representation of user interface 800, a user can select which users to send an electronic communication by selecting a picture of a user such as picture 810 or 840. In an optional embodiment, a user can send an electronic communication to all users with a particular interest by selecting a relevant graphical element such as the dog, where all of the users that are associated with an interest in "DOGS" would be notified. Such a selection can be performed by a user selecting the graphical element by touching a screen, moving an input device, pressing a button, and the like.

Figure 9:
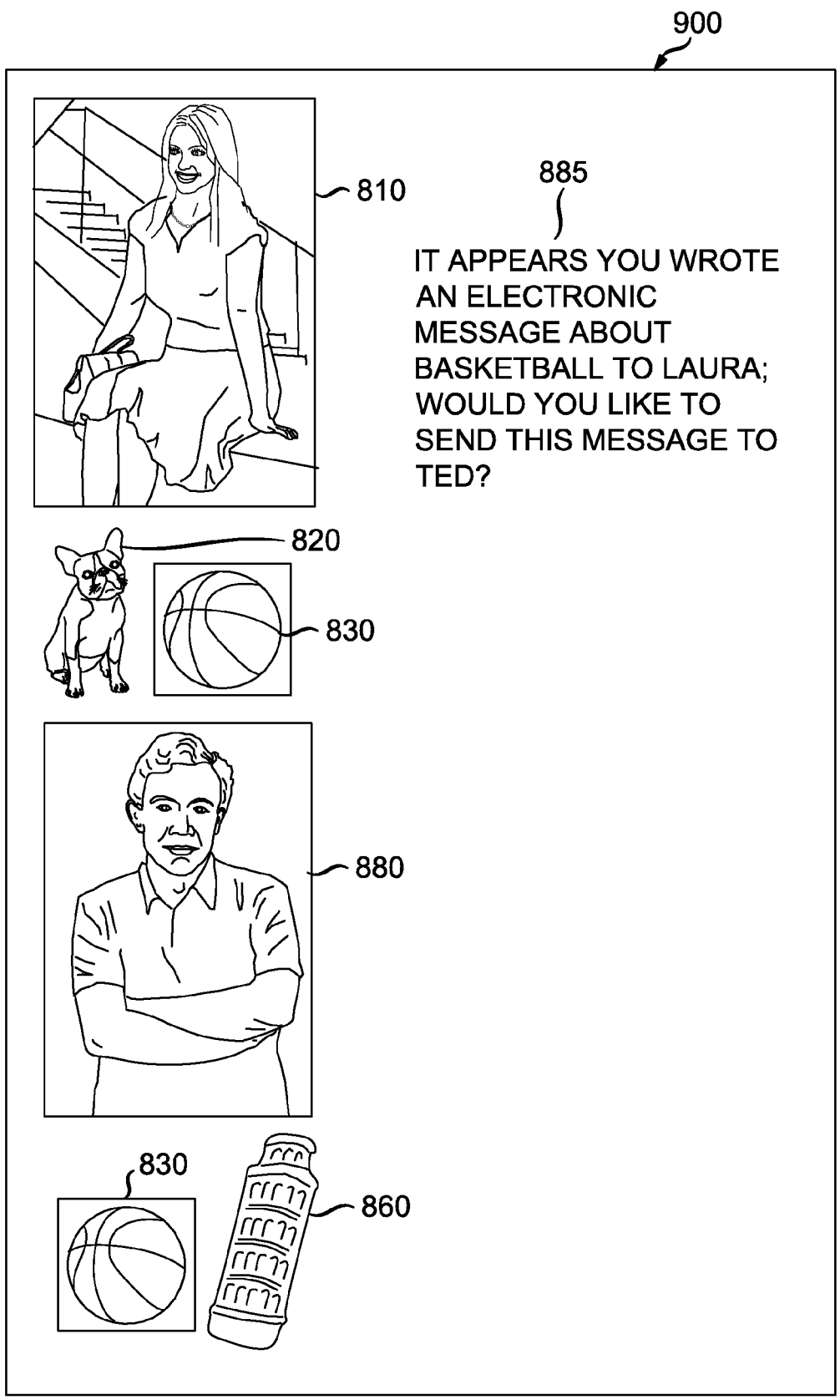
FIG. 9 displays a user interface for selecting users to message in accordance with an embodiment of the present disclosure.

FIG. 9 is an exemplary embodiment of a user interface 900 that can also be used to transmit electronic communications to different users. In this embodiment of a user interface, a message 885 indicates that an electronic communication that a user is drafting to "LAURA" which corresponds to a user shown in picture 810 has the context of "BASKETBALL". User interface 900 then has Laura's profile picture 810 shown with her various interests of "DOGS" shown by icon 820 and "BASKETBALL" which is represented by picture 830. Because the electronic message has a context of "BASKETBALL", the user interface automatically highlights the picture 830 that corresponds to the topic of "BASKETBALL". In addition, the user interface 900 automatically adds a picture 880 of user "TED" because the corresponding user profile for Ted indicates an interest in "BASKETBALL". Hence, picture 830 for Ted is also highlighted like it was for "LAURA". This gives an indication to the user drafting or transmitting the electronic communication that the communication has been recognized as being about the topic/context "BASKETBALL" and the respective user who have an interest in that context.

Figure 10:
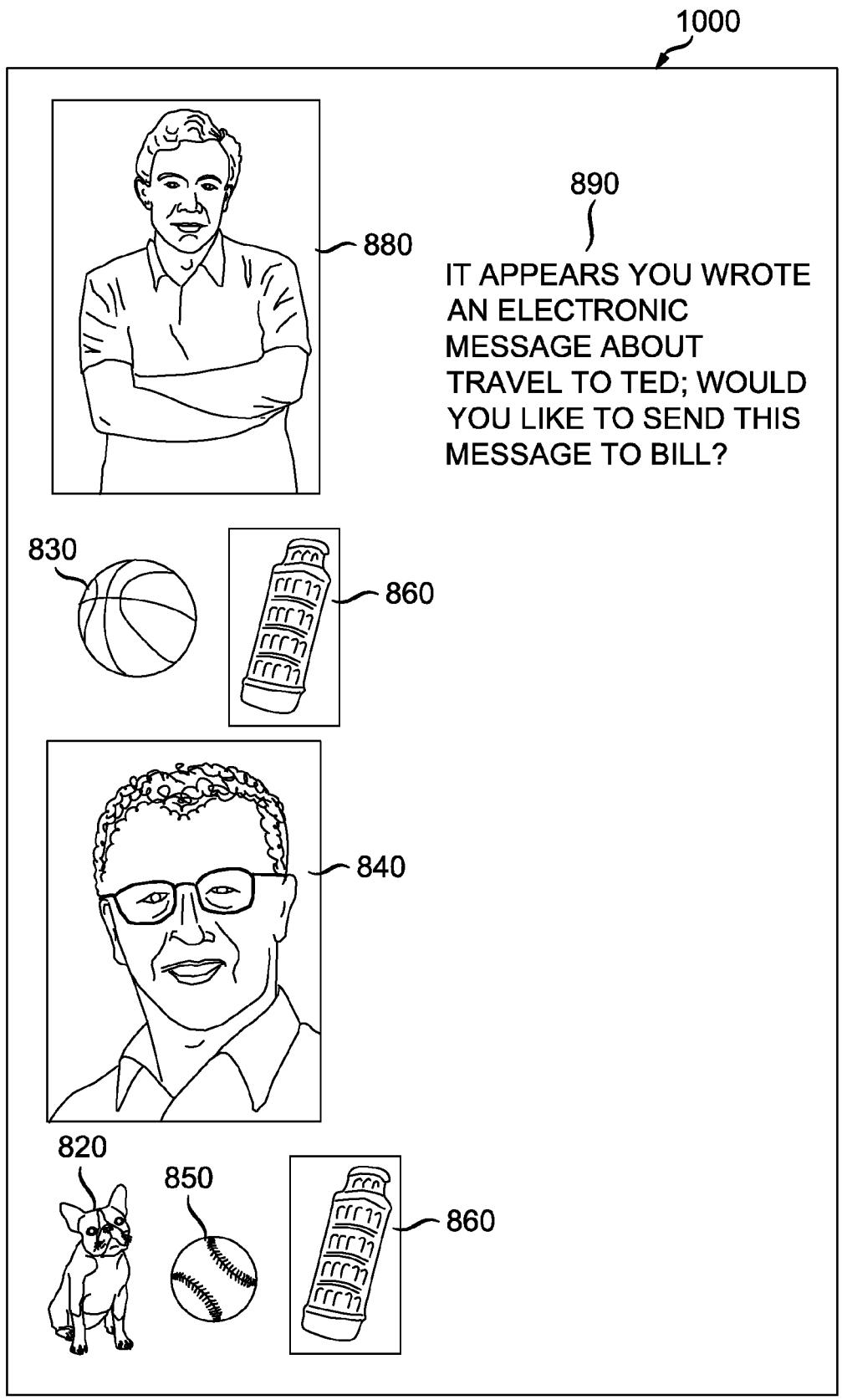
FIG. 10 displays a user interface for selecting users to message in accordance with an embodiment of the present disclosure.

FIG. 10 is an exemplary embodiment of a user interface 1000 that can be used to transmit electronic communications to different users. In this embodiment, a different topic "TRAVEL" has been recognized as the context of an electronic communication as shown in the automatically generated message 890. In this example, the communication about "TRAVEL" is addressed to a user 880, "TED". Because the topic has changed from "BASKETBALL" from FIG. 9 to "TRAVEL" in FIG. 10, a new group of users are shown corresponding to "TED" 880 and "BILL" 840. In this user interface, the graphical element 860 corresponds to "TRAVEL". Other graphical elements 830 is shown for the user picture 880 for "TED" while graphical elements 820 and 850 are shown for user picture 840 which corresponds to "BILL".

It should be understood that the elements shown in the figures can be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that can be substantially represented in computer readable media and so executed by a computer or processor, whether or not such computer or processor is explicitly shown. The computer readable media and code written on can be implemented in a transitory state (signal) and a non-transitory state (e.g., on a tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. It is noted that modifications and variations can be made by persons skilled in the art in light of the above teachings.

The invention claimed is:

1. A method for determining where to send a message among a plurality of users related to an originating user, wherein the message is intended to be sent from the originating user to a first user of the plurality of users, the method comprising:
   determining a keyword used in the message;
   determining whether the keyword is associated with a context, wherein the context defines a relationship among a plurality of keywords;
   determining a first set of users of the plurality of users associated with the context, said first set of users including at least one second user different from the first user, and a second set of users of the plurality of users not associated with the context, wherein determining the first set of users includes accessing a database storing information in which different contexts are associated with each of the plurality of users;
   displaying indications of the context of the message and of the first set of users as graphical elements on a user interface of the originating user, each user of the set of users being represented as a first graphical element associated with at least one second graphical element representing at least an interest of said user; and
   transmitting the message to the first set of users including the at least one second user via a communication network, and prohibiting sending the message to the second set of users.

2. The method of claim 1, wherein determining the context is associated with the first set of users and not associated with the second set of users includes obtaining profiles of the plurality of users and determining whether the context is included in the profiles of the first set of users.

3. The method of claim 1, wherein transmitting the message includes receiving a user command and transmitting the message in response to the user command.

4. The method of claim 1, wherein the graphical elements include images representing the users of the first set of users.

5. The method of claim 4, wherein each of the graphical elements is associated with at least one characteristic of the user profile of each of the users of the first set of users.

6. A method for determining where to send a message among a plurality of users related to an originating user, the method comprising:
   sending the message from the originating user to a first user;
   determining a keyword used in the message;
   determining whether the keyword is associated with a context, wherein the context defines a relationship among a plurality of keywords;
   determining a first set of users of the plurality of users associated with the context, said first set of users comprising at least one second user different from the first user, and a second set of users of the plurality of users not associated with the context, wherein determining the first set of users includes accessing a database storing information in which different contexts are associated with each different user of the plurality of users;

displaying indications of the context of the message and of the first set of users as graphical elements on a user interface of the originating user, each user of the set of users being represented as a first graphical element associated with at least one second graphical element representing at least an interest of said user; and transmitting the message to the first set of users including the at least one second user via a communication network, and prohibiting sending the message to the second set of users, wherein the context is indicated in the message.

7. The method of claim 6, wherein determining the context is associated with the first set of users and not associated with the second set of users includes obtaining profiles of the plurality of users and determining whether the context is included in the profiles of the first set of users.

8. The method of claim 6, wherein transmitting the message includes receiving a user command and transmitting the message in response to the user command.

9. The method of claim 6, wherein the graphical elements include images representing the users of the first set of users.

10. The method of claim 9, wherein each of the graphical elements is associated with a at least one characteristic of the user profile of each of the users of the first set of users.

11. An apparatus for determining where to send a message among a plurality of users related to an originating user, wherein the message is intended to be sent from the originating user to a first user of the plurality of users, said apparatus comprising at least one controller configured to:

determine a keyword used in the message;

determine whether the keyword is associated with a context, wherein the context defines a relationship among a plurality of keywords;

determine a first set of users of the plurality of users associated with the context, said first set of users including at least one second user different from the first user, and a second set of users of the plurality of users not associated with the context, wherein determining the first set of users includes accessing a database storing information in which different contexts are associated with each of the plurality of users;

display indications of the context of the message and of the first set of users as graphical elements on a user interface of the originating user, each user of the set of users being represented as a first graphical element associated with at least one second graphical element representing at least an interest of said user; and transmit the message to the first set of users including the at least one second user via a communication network, and prohibiting sending the message to the second set of users, wherein the context is indicated in the message.

12. An apparatus for determining where to send a message among a plurality of users related to an originating user, said apparatus comprising at least one controller configured to:

send the message from the originating user to a first user of the plurality of users;

determine a keyword used in the message;

determine whether the keyword is associated with a context, wherein the context defines a relationship among a plurality of keywords;

determine a first set of users of the plurality of users associated with the context, said first set of users including at least one second user different from the first user, and a second set of users of the plurality of users not associated with the context, wherein determining the first set of users includes accessing a database storing information in which different contexts are associated with each of the plurality of users;

display indications of the context of the message and of the first set of users as graphical elements on a user interface of the originating user, each user of the set of users being represented as a first graphical element associated with at least one second graphical element representing at least an interest of said user; and transmit the message to the at least one second user via a communication network, and prohibiting sending the message to the second set of users, wherein the context is indicated in the message.

\* \* \* \* \*